UNITED STATES PATENT OFFICE.

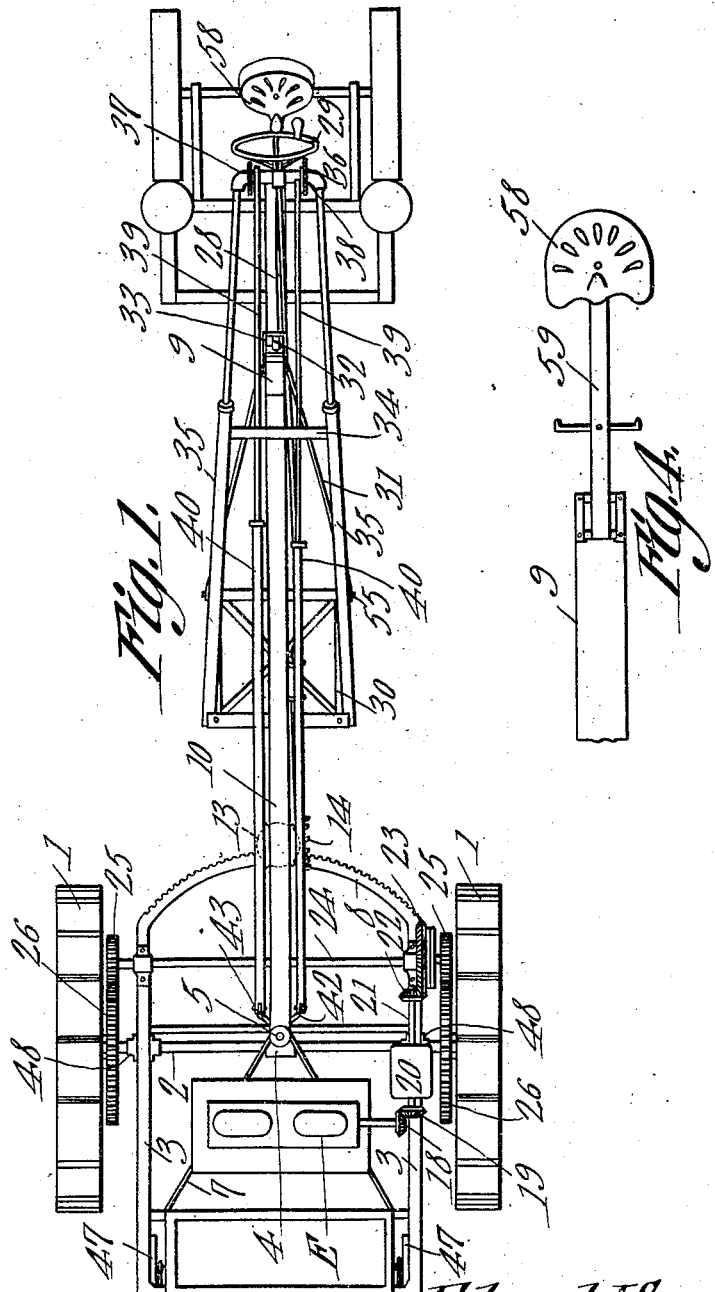

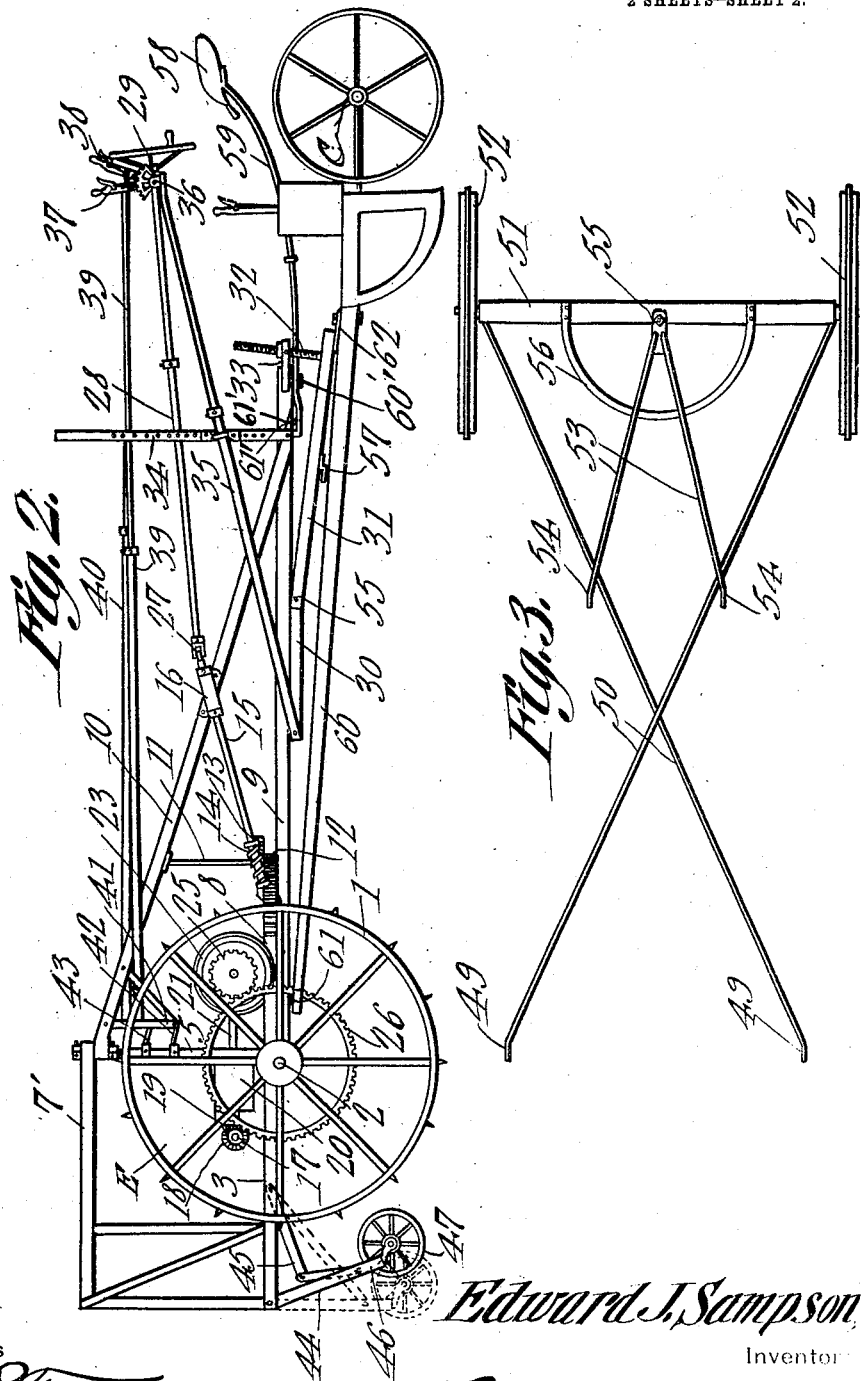

EDWARD J. SAMPSON, OF GRANDMOUND, IOWA.

TRACTOR.

1,104,277.  Specification of Letters Patent.  Patented July 21, 1914.

Application filed February 20, 1913. Serial No. 749,699.

*To all whom it may concern:*

Be it known that I, EDWARD J. SAMPSON, a citizen of the United States, residing at Grandmound, in the county of Clinton and State of Iowa, have invented a new and useful Tractor, of which the following is a specification.

The present invention relates to improvements in explosive engine tractors, the primary object of the invention being the provision of a two-wheeled tractor, provided with draft attaching means, whereby the tongue of a wagon or farm implement may be connected thereto, the wagon or farm implement constituting a means for preventing the over-balancing of the tractor, and itself being hauled by the tractor similarly to the draft animals, the present construction thus providing a means whereby the use of a tractor for hauling and farming purposes is more practically effected, as the length of the complete apparatus is reduced, and the tractor is manipulated so as to be steered and turned in a shorter space, than is the usual practice when a three or four wheel tractor is employed.

A further object of the present invention is the provision of a novel frame and connecting means, for a two-wheel explosive engine tractor, whereby the implement to be hauled is readily attached thereto through the medium of its tongue or shaft, the tractor frame being provided with auxiliary means for maintaining the same against over-balancing when disconnected from the implement, or with a trailing support for connection thereto during transportation of the tractor.

With the foregoing and other objects in view which will appear as the description proceeds, the invention resides in the combination and arrangement of parts and in the details of construction hereinafter described and claimed it being understood that changes in the precise embodiment of the invention herein disclosed can be made within the scope of what is claimed without departing from the spirit of the invention.

In the drawings Figure 1 is a top plan view of the complete tractor attached to a corn planter. Fig. 2 is a side elevation thereof. Fig. 3 is a top plan view of the auxiliary supporting structure for the rear end of the tractor frame. Fig. 4 is a top plan view of the seat and supporting member thereof.

Referring to the drawings, the numeral 1 designates the two tractor wheels, which are mounted rotatably upon the axle 2, said axle 2 having attached thereto, through the medium of the supporting brackets 48, the frame 3, which forms a support for the explosive engine E, which is disposed transversely of the frame, in the most effective manner. A center support 4 is provided and has upstanding therefrom, a post or standard 5, which constitutes the pivoting element for the axle, which is in reality the steering axle of the tractor. The diverging brackets 7 are connected to the upper end of the post 5 and support the upper end of the radiator frame 7' which is supported from below by the engine platform 3.

Connected to the rear end of the frame 3 is the steering toothed segment 8, while extending from the under side thereof, and from the axle rearwardly is the longitudinal beam 9, which is braced from the upper end of the post 5 by the downwardly inclined beam 10.

A vertical rod or post 11 is mounted for rotation between the beams 9 and 10 to the rear of the toothed segment 8, and carries upon its lower end the pinion 12 in mesh with the teeth of the segment 8, and the horizontal worm gear 13, which is in mesh at all times with the worm 14 carried by the inclined shaft 15, said shaft 15 being journaled for rotation in the supporting sleeve 16 carried by the brace 10.

The forward end of the beams 9 and 10 are thus pivotally connected to the post 5, which constitutes in reality the steering post or king bolt connection of the tractor axle 2 to the remaining part of the machine.

The engine shaft 17 is provided with a pinion 18, which is in mesh with the pinion 19 of the rearwardly extending horizontal shaft of the transmission and control mechanism 20, which is of any desired design. The shaft 21 thereof is extended rearwardly and carries the pinion 22 which engages the differential gearing 23 connected to the driving shaft 24 which as shown in Fig. 1, is journaled transversely of the frame 3 at the rear of the axle 2, and carries upon its extreme end the driving pinions 25 which are in mesh at all times with the large gears 26 keyed to and rotatable with the tractor wheels 1. By this means the engine E will rotate the tractors and the control thereof will be directly under the operator, as will presently appear.

The engine E is so disposed that upon the opposite end of the shaft 17 may be mounted a drive wheel (not shown), whereby the engine may be used for sawing or other farm purposes when in a stationary position, when desired.

The universal joint 27 connects the shaft 15 to the telescopic steering shaft 28, which as shown in Fig. 2 is extended rearwardly and has connected thereto in ready access to the operator, the steering wheel 29. The shaft 28 is made telescopic, so that the same may be shortened or lengthened, while the universal joint 27 is provided to permit of the lowering or raising of the telescopic shaft 28 so as to bring the steering wheel 29 in ready position to the operator.

A frame 30 is connected to the under side of the beam 9 and the transversely disposed shaft 55 constitutes the pivoting point for the rearwardly extending and converging arms 31, whose rear free ends carry the lower rotatable end of the adjusting screw 32, said adjusting screw 32 being connected by the usual nut structure in the frame 33, so that the screw 32 may be rotated to raise or lower the rear end of the beam 9 relatively to the supporting frame 31.

An upstanding bail shaped frame 34 is carried adjacent to the rear end of the beam 9 and provides a means for adjustably supporting the telescopic frame 35, whose forward end is connected to the forward end of the frame 30, while the rear end extends rearwardly to support the standard 36 which carries the shaft to which the clutch operating lever 37 and the engine control lever 38 is connected. By means of the adjustable connection of the telescopic frame 35 to the frame 34, the levers 38 and 37 may be adjusted vertically to be placed in the desired position for manipulation.

Connected to the respective levers 37 and 38, are the forwardly extending telescopic connecting rods 39 and 40, which have their forward ends connected to the respective clutch control bell crank lever 42 and the engine control lever 43, both of which levers are carried by the bracket 41, as clearly illustrated in Fig. 2. Thus the control of the engine, is placed in easy reach of the operator, the said levers 37 and 38 and the steering wheel 29 being placed so that all may be readily operated to control the steering of the tractors 1, and the control of the engine, both as to speed, and forward and reverse movements.

In order to provide a means to prevent the forward end of the frame 3 from tilting or overbalancing the frame 9 and 10, when the same is disconnected from the corn planter 59, or the sulky as shown in Fig. 3, an arm 44 is swingingly connected to the under side of the forward end of the frame 3 and is disposed to be folded as shown in full lines or extended as shown in dotted lines through the medium of the collapsible brace 45, the fork 46 being carried in the lower end of the arm 44 and having journaled therein, the caster wheel 47, which normally assumes a full line position, as shown in Fig. 2, but may be extended to engage the ground, as shown in dotted line position to thus properly support the forward end of the frame as described.

The supporting members 48 of the frame 3 which are connected to the axle 2, when the tractor is supported upon the sulky, as shown in Fig. 3, receive the apertured ends 49 of the cross rods 50, the rear ends of such cross rods being connected to the axle 51 of such sulky and have journaled thereon the wheels 52. The converging arms 53, which are connected to the casing 55, are disposed to receive the rear end of the arm 31 when the sulky is in engagement with the tractor, and have their forward ends 54 apertured and connected to the transverse rod 55, thus properly connecting the sulky wheels to the tractor so that the rear end of the frame may be properly supported. The seat 58 is carried by the curved support 59 which is properly connected to the beam at 60' and 61' to permit the operator ready access to the steering wheel 29 and the control levers 37 and 38. This sulky is only employed when the tractor is being moved from place to place.

When a corn planter and other farming implement as C is connected to the tractor, the same supports the rear end of the frame 9 as illustrated in Fig. 2, and has its tongue 60 disposed below the beam 9 and connected at its forward end by means of the attaching eye 61, while the plate 62 thereof engages the extreme ends of the arms 31, thus connecting the corn planter so that the same will support the rear end of the tractor, and without the necessity of cutting the tongue as is the usual practice in attaching farming implements to a tractor. By this means the operator may sit in the proper position for operating the planter or other implement, and at the same time have under full control the steering of the tractor and the operation of the engine.

What is claimed is:

1. A two wheeled explosive engine tractor, including an axle, a frame carried by the axle, two tractor wheels rotatable upon the axle, a post forming a pivoting element for the axle and wheels carried by the frame, a longitudinal beam extending rearwardly from the frame, an inclined beam connected pivotally to the upper end of the post and having its rear end connected to the rear end of the longitudinal beam, a pair of arms swingingly connected below and at the free end of the longitudinal beam, and an adjusting screw mounted in the rear end of the longitudinal beam and the free ends of the pair of arms to regulate the position of the arms relatively to the beam.

2. A two wheeled explosive engine tractor, including an axle, a frame carried by the axle, two tractor wheels rotatable upon the axle, a post forming a pivoting element for the axle and wheels carried by the frame, a longitudinal beam extending rearwardly from the frame, an inclined beam connected pivotally to the upper end of the post and having its rear end connected to the rear end of the longitudinal beam, a pair of arms swingingly connected below and at the free end of the longitudinal beam, an adjusting screw mounted in the rear end of the longitudinal beam and the free ends of the pair of arms to regulate the position of the arms relatively to the beam, and a hook connected to the under side of the longitudinal beam adjacent the axle, whereby the forward end of the tongue of an implement may be connected thereto while the free ends of the pair of arms engage the upper portion of the tongue adjacent the frame of such implement.

In testimony that I claim the foregoing as my own, I have hereto affixed my signature in the presence of two witnesses.

EDWARD J. SAMPSON.

Witnesses:
  E. H. VETTER,
  MARGARET CLARKE